(12) United States Patent
Macome et al.

(10) Patent No.: US 8,017,675 B2
(45) Date of Patent: Sep. 13, 2011

(54) ASPHALT ENHANCING ADDITIVE

(75) Inventors: Alejandro Macome, Buenos Aires (AR); Vulijscher Felix Osvaldo, Buenos Aires (AR); Fabian Alberto Taraborelli, Miami, FL (US)

(73) Assignee: Asphaltable S.A., Buenos Aires (AR)

( * ) Notice: Subject to any disclaimer, the term of this patent is extended or adjusted under 35 U.S.C. 154(b) by 0 days.

(21) Appl. No.: 12/439,623

(22) PCT Filed: Sep. 5, 2007
(Under 37 CFR 1.47)

(86) PCT No.: PCT/US2007/077587
§ 371 (c)(1),
(2), (4) Date: Nov. 23, 2009

(87) PCT Pub. No.: WO2008/070234
PCT Pub. Date: Jun. 12, 2008

(65) Prior Publication Data
US 2010/0331459 A1    Dec. 30, 2010

(30) Foreign Application Priority Data
Sep. 5, 2006 (AR) ................. P060103860

(51) Int. Cl.
*C08L 95/00* (2006.01)
*C08K 5/3445* (2006.01)
(52) U.S. Cl. .......................................... 524/71; 524/106
(58) Field of Classification Search ............... 524/71, 524/106
See application file for complete search history.

(56) References Cited

U.S. PATENT DOCUMENTS
4,430,465 A * 2/1984 Abbott ............................ 524/64

FOREIGN PATENT DOCUMENTS
WO    WO 02/053645    * 7/2002
* cited by examiner

*Primary Examiner* — Peter Szekely
(74) *Attorney, Agent, or Firm* — Norris McLaughlin & Marcus, P.A.

(57) ABSTRACT

An asphalt enhancing additive, an asphalt cement and an asphalt mixture containing the additive, wherein the additive causes the mixture to be more easily workable so that the asphalt mixture can be manufactured at a temperature lower than the conventional ones, wherein the additive comprises the mixture of an aminic compound, a lubricant and a flux.

16 Claims, 2 Drawing Sheets

ASPHALT ENHANCING ADDITIVE

BACKGROUND OF THE INVENTION

1. Field of the Invention

The present invention relates to the field of compounds, cements and asphalt mixtures for building up, paving and repairing roads, and more particularly, the invention refers to an asphalt additive as well as to an asphalt cement and an asphalt mixture containing the additive, where the additive, when added to the cement and mixture, causes the latter to be easily manufactured and applied, as well as more lasting and stable.

2. Description of the Prior Art

Many additive compounds such as cements and asphalt mixtures have been developed for an easy manufacturing, application and durability of the asphalt covering. Asphalt or bituminous compositions comprising styrene-butadiene-propylene polymers, propylene and solvent are some of them.

Some of these compositions are disclosed as having acceptable properties at room temperature, such as those indicated in U.S. Pat. No. 5,840,109 and U.S. Pat. No. 3,312,157.

On the other hand, U.S. Pat. No. 5,911,817 discloses mineral lubricant base oils which can be added to asphalt compositions to improve their properties at a low temperature. U.S. Pat. No. 4,878,950 discloses a material for bituminous compositions to cover roofs, containing a low molecular weight olefinic copolymer or homopolymer.

U.S. Pat. No. 5,961,709 discloses an asphalt composition comprising paraffinic oils. U.S. Pat. No. 5,750,598 discloses the addition of a curing agent with sulphur supply to a bitumen/polymer composition.

U.S. Pat. No. 3,312,157 discloses a product of the type of the present invention with a main difference being that such asphalt mixture is prepared with methylbenzene.

None of the above mentioned publications refers to the ultimate achievement which is an asphalt mixture manufactured in similar conditions to hot manufactured asphalt concrete and applied at temperatures near 90°, quite lower than the conventional ones, namely 130° C. to 150° C., achieved with the additive of the invention.

Finally, and truly exceeding the above mentioned referred compositions and additives quality, the additive of the Argentine Patent Application number P020100585 of one of the inventors of this invention, discloses an additive comprised by lubricants, fluxes and solvents such as kerosene, gas oil, etc. Although this additive has proven to have a behavior exceeding the known one, it has still not overcome other problems such as those generated by the solvent such as gas oil, kerosene, etc., which are necessary in these mixtures. However, solvent can not be directly eliminated, unless the composition could be modified so that is may provide the intended results. However, a composition with no solvent keeping this performance has not still been obtained.

For example, during the manufacturing as well as laying or application of asphalt mixtures obtained with solvent content, the temperature values shall be taken into account, since the evaporation of the solvent remaining in the carpet destroys the cohesive structure of the asphalt cover. Besides, from the ecological as well as safety point of view, costs and so on, solvent has been a component which would be desirable not to be used in these additives, but it has not been still removed from them due to the fact that its application has been always necessary to provide the mixture with essential characteristics for working the mixture.

Therefore, it would be convenient to obtain a composition or additive, such as the cements and mixtures used with it, allowing to work the mixtures at low temperatures, apply them to temperatures below the usual working ones, avoiding the structural impairment of the asphalt cover and preventing the risks of contamination and safety of the solvents and the components used in well known conventional additives.

SUMMARY OF THE INVENTION

It is therefore an object of the present invention to provide a new additive for the elaboration of asphalt mixtures at temperatures lower than the conventional ones, for example, at temperatures between 135° and 150° and in order that the mixtures can be applied at low temperatures, such as about 90° C., truly below the ones at which the traditional mixtures are worked out, namely the conventional or normal temperatures of between 130° C. and 150° C.

It is another object of the present invention to provide an additive to obtain different viscosity asphalt mixtures being capable of an easier spreading and compacting, having a higher resistance to slippage, higher stability, higher durability as well as other superior characteristics when compared to the known asphalt compounds and mixtures.

It is also another object of the present invention to provide an additive to work out asphalt mixtures through methods not involving ecological and safety risks for the area and the staff.

It is also another object of the present invention to provide an asphalt enhancing additive to be applied for obtaining asphalt mixtures which can be worked out at temperatures below 150° and be applied at temperature quite below the already known ones, where the additive comprises at least from about 6% to about 10% of an aminic compound, from about 50% to about 80% of a flux, and from about 10% to about 40% of a lubricant.

It is also another object of the present invention to provide an improved binding properties asphalt cement comprising a bituminous binder and the above mentioned additive.

It is also another object of the present invention to provide an asphalt mixture capable of being worked and laid at temperatures below the usual ones, comprising petreous aggregates of different sizes, an asphalt cement and the above mentioned additive.

It is even a further object of the present invention to provide an asphalt cement with enhanced binding properties, the cement comprising:

a bituminous binder, and about 3% to about 5% based on the total weight of the cement, of an additive comprising at least:

from about 6% to about 10% of an aminic compound;

from about 50% to about 80% of a flux, and from about 10% to about 40% of a lubricant.

It is still a further object of the present invention to provide an asphalt mixture capable of being processes and worked a temperature below a conventional temperature, the mixture comprising at least:

aggregates having different particle sizes, and an asphalt cement with enhanced binding properties, the cement comprising:

a bituminous binder, and about 5% based on the total weight of the cement, of an additive comprising at least:

from about 6% to about 10% of an aminic compound;

from about 50% to about 80% of a flux, and from about 10% to about 40% of a lubricant.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
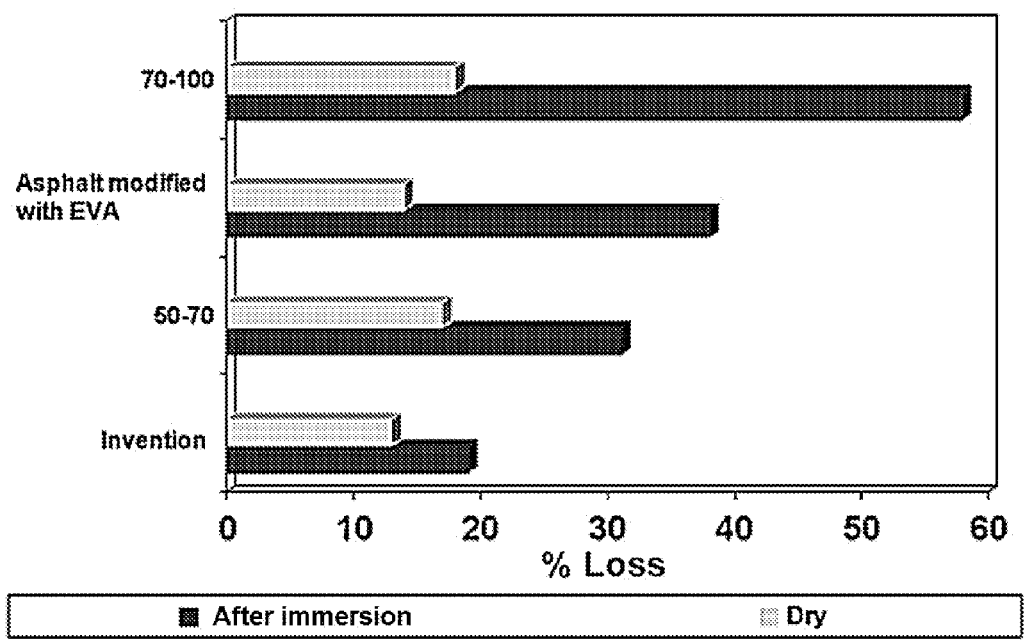
FIG. 1 is a chart with the adherence results for asphalt treated with the invention additive, dry and with immersion/dipping, according to the results obtained in Table 1.

Now referring with more detail to the invention, it comprises an additive which is mainly designed to mix it with asphalt cements and be a part of the asphalt mixtures. This additive decreases the asphalt medium viscosity, therefore, the temperature necessary to make the mixture shall be lower and the application of the mixture shall be also made at a lower temperature.

The additive of the present invention mainly comprises three components, such as an aminic compound, a lubricant and a flux, and more preferable it is comprised of from about 6% to about 10% of an aminic compound or compounds, preferable a cationic one, from about 50% to about 80% of flux and from about 10% to about 40% of lubricant. The sum of three components is always 100%, and the asphalt cement is added with defined percentages of the latter. One ton of asphalt mixture generally contains 50 kilograms of asphalt cement, the additive percentage is referred to this last value. In general, it can be referred as about 3% to about 5% on the total asphalt cement.

The lubricant used in the additive of the present invention is an olefinic type, and can be as follows: crankcase lub oils (Esso Motor Oil, YPF-Repsol or Shell type, SAE 40 viscosity).

The additive flux, as it will be below seen, is an olefinic polymer having a high molecular weight, such as between 1200 Mn to about 2900 Mn, and high viscosity, such as polybutene or polyisobutilene. Generally, the flux is at least one of a polymer and combination of polymers having different viscosities, the polymer or polymers having a molecular weight of from about 900 Mn to about 2900 Mn, and a viscosity at 100° C. of from about 200 centistokes to about 5000 centistokes.

Flux purpose is to enhance the adherence of the asphalt aggregate-binding pair, thus avoiding in this way future releases of the aggregate, a better elasticity yield, better fatigue strength, lower aging and therefore a higher lifetime. Flux percentage can be also varied depending on if this is applied for patching, where it shall have a lower amount, or if it is applied for paving purposes, where it shall have a higher amount. The higher the amount of flux, the better adherence and creeping response.

The lubricant employed in the additive of the present invention is an olefinic one, preferably a refined olefinic hydrocarbon of a high viscosity index, with good emulsification, which can be a hydrocarbon used as a hydraulic medium and manufactured with special lubricant bases, and optionally with additives providing wear proof, corrosion proof, antioxidant and antirust properties.

Lub oil, which increases the workability of the mixture, must have a high calorific capacity to keep the manufacturing temperature during several hours and in order to allow the polymer to have a more efficient bond to the aggregate and thus obtain a more adhesion of the modified asphalt binder in its application.

Lubricants used in this invention can be those having a viscosity index of 95, a flash point of 180 to 242° C. and a pour point of 10, such as for example H22 to H220 products, ESSO's NUTO H32 being the most preferred one.

The percentages of the components in the additive vary according to the asphalt cement type to be used, according to the future requirements the pavement to be made shall be exposed to, and the available aggregates. Therefore, the asphalt mixtures treated with the additive of the present invention show a reduced spraying effect (higher safety) due to a higher adhesive capability and low noise, and the gap percentages in their structure. The asphalt mixtures of the invention are particularly useful for the construction of micro pavement, 2-3 cm thickness, for the repaving of streets, routes or highways, in pavement carpets normal thicknesses manufactured with asphalt concrete. These pavement carpet normal thicknesses should be 50 to 60 mm.

The three products comprising the additive of the invention use to change their proportions, but always within the above indicated limits.

The increase or decrease of any of these product shall be defined according to the requirements the future pavement carpet to be constructed shall be exposed to.

The weather conditions, melt waters, affinity of the aggregates with the asphalt cement, type of traffic, base cracking grade, and so on shall be an important influence.

The three products comprising the additive have been thoroughly studied, they have a high affinity among them, and at the same time with the asphalt cement, so that they homogenize comprising a stable additive product.

The preparation of the additive of the invention can be carried out through different techniques, although a preferred way of obtaining it shall be referred to.

Preparation of the Flux

First, it is worthwhile to mention that flux is a high molecular weight olefinic polymer which needs a prior temperature for its handling and also, when polymer mixtures are used as flux, an outer heating is needed for its correct mixing process and further incorporation to the remaining components of the additive.

| | | Properties of the flux (Polymer) | | | |
|---|---|---|---|---|---|
| | Units | Method | 30 | 150 | 200 |
| Appearance: | — | Visual Bright and Clear Free Susp. Matter | | | |
| Molecular weight: | Mn | PLP CR-062 | 1200-1375 | 2050-2300 | 2470-2730 |
| Molecular weight Less than 500 | % | PLP CR-062 | 12 | 5 | — |
| Dispersivity (Max.) | — | PLP CR-062 | 2.5 | 2.8 | — |
| Viscosity (37.8* C.) | cSt. | ASTM D-445 | — | — | — |

-continued

| Properties of the flux (Polymer) | | | | | |
|---|---|---|---|---|---|
| | Units | Method | 30 | 150 | 200 |
| Viscosity at (100*C) | cSt. | ASTM D-445 | 595-665 | 2150-2700 | 4009-4503 |
| Relative density | 15/15° C. | ASTM D-1298 | 0.887-0.905 | 0.896-0.914 | 0.900-0.916 |
| Flash point C.O.C. (min.) | * C. | ASTM D-92 | — | — | — |
| Flash Point P.M. (Min) | * C. | ASTM D-93 B | 170 | 180 | 190 |
| Scale Color Pt/Co (Max.) | APHA | ASTM D-1209 | 70 | 70 | 70 |
| N* Neutralization (Max.) | mgHOK/Gr | ASTM D-974 | 0.02 | 0.02 | 0.02 |
| Water (Max.) | PPm. | ASTM D-6304 | 70 | 70 | 70 |
| Iron (Max) | PPm. | PLP AN-0100 | 4 | 4 | 4 |
| Aluminum (Max) | PPm. | PLP AN-0100 | 5 | 5 | 5 |
| Sodium (Max) | PPm. | PLP AN-0100 | 1 | 1 | 1 |
| Chloride(Max.) | PPm. | ASTM D-2522 | 200 | 200 | 200 |

Lubricant

This is a refined olefinic hydrocarbon having a high viscosity index, good emulsification, anticorrosive, antirust and antifoam properties.

High chemical stability hydraulic oil or lubricant base has a very good antirust protection.

| Typical Analysis | | | | | | | | | | | |
|---|---|---|---|---|---|---|---|---|---|---|---|
| | | | PRODUCTS | | | | | | | | |
| TESTS | UNIT | METHOD | 22 | 32 | 37 | 46 | 68 | 100 | 150 | 220 | 320 |
| ISO Degree | — | — | 22 | 32 | (*) | 46 | 68 | 100 | 150 | 220 | 320 |
| Viscosity 40° C. | cSt. | ASTM D-445 | 22 | 31.5 | 37.5 | 44 | 66 | 102 | 148 | 218 | 321 |
| Viscosity | Index | ASTM D-2270 | 95 | 95 | 95 | 95 | 95 | 95 | 95 | 95 | 95 |
| Flash Point | * C. | ASTM D-92 | 180 | 205 | 210 | 210 | 215 | 220 | 230 | 240 | 250 |
| Pouring Point | * C. | ASTM D-97 | −15 | −27 | −12 | −24 | −24 | −9 | −9 | −9 | −9 |
| Corrosion o/Cu (3 h −100 * C.) | — | ASTM D-130 | 1b | 1b | 1b | 1b | 1b | 1b | 1b | 1b | 1b |
| Rust | — | ASTMD-665B | Pass | Pass | Pass | Pass | Pass | Pass | Pass | Pass | Pass |
| Number of Acid | mg KOH/g | ASTM D-974 | 0.2 | 0.2 | 0.2 | 0.2 | 0.2 | 0.2 | 0.2 | 0.2 | 0.2 |
| FZG Test | stages | DIN 51354 | 10 | 10 | 10 | 10 | 10 | 10 | 10 | 10 | 10 |
| Emulsion at 54.4 * C. | Min. | ASTM D-1401 | 30 | 30 | 30 | 30 | 30 | — | — | — | — |
| Emulsion at 82.2 * C. | Min. | ASTM D-1401 | — | — | — | — | — | 30 | 30 | 30 | 30 |

The above mentioned typical analysis values are not a specification, they are representative of manufacturing statistical values. (*) It does not apply to a grade defined by the ISO system.

Packing:

BP hydraulic line is traded in drums of 20 and 205 liters. Besides, BP 68 in 1,000 liters, BP 37 in bulk and BP 320 only in drums of 205 liters and in bulk.

Health and Safety Dangers:

Since it is a refined product, it does not pose risks for health and safety, provided it is used in the recommended way.

Intake: Do not induce vomit, provide milk or water containing activated carbon.

Inhalation: Since it is a poorly volatile product, the inhalation risk is minimum.

Eyes splashing: Immediately wash with abundant water.

Skin contact: It can be considered as harmless when it is under a short contact with a normal and healthy skin. It is also recommended to wash the area with abundant water and soap, and using protecting creams when it is deemed necessary. Use suitable gloves during its handling.

Fire danger: Extinguishing method (chemical power, foam).

If no fire extinguisher is available, sand or soil for small magnitude fires can be used. In no case a water jet shall be used, since it can spread the fire.

Spills: The contaminated area shall be ventilated and its absorption shall be carried out with sand, soil or similar material, and its final disposal shall be made according to the in force regulations.

Aminic Compound:

The cationic polarity aminic compound is of an imidazoline alkylamido type, such as amido-amine, as a cationic support for promoting the further adhesion on siliceous type aggregates, shifting the monolayer which is usually recovering the negative charge density surfaces.

Aminic compounds of excellent quality can be obtained from products traded by Laher Mercantil, Polydem S.A., Akzo Nobel, etc.

The additive of the invention can also incorporate sundry enhancers.

Adherence Enhancers.

When adherence enhancing additives are referred to, adhesion promoters are preferably referred to.

Adhesion and detachment are two phenomenon directly related to adhesion promoters (additives). Adhesion is present at the aggregate surface, a chemical bond is obtained between the latter and asphalt. This type of adhesion is called active adhesion.

Asphalt cement is an oily material having a low polarity and very low affinity with the aggregate surface. The latter has high affinity with water, therefore it is assumed that asphalt cement shall be shifted by water.

In order to reach a perfect chemical linkage between asphalt and the aggregate, additives shall be incorporated to change the asphalt cement nature.

These adherence enhancing additives are also referred to as: adhesion promoters and detachment proof agents. It will be always easier and more effective to modify the asphalt, since it is the one having the least proportion in the asphalt mixture.

The polar groups or heads of groups of the adhesion promoting molecules strongly bind the aggregate polar surface. On the other hand, the molecules non polar hydrocarbon bodies are compatible with asphalt and fit into its cover.

Up to this point, the adhesion promoters operate as a water proof bridge between the asphalt and the aggregate surface. The modified cement having adhesion promoting agents has a higher affinity with the aggregate surface than water.

Therefore, it shall not only obtain a good binding with dry aggregates, but it can also shift water and make a chemical linkage with wet aggregate surfaces.

In the case of unavailability of excellent quality and difficult coverage aggregates, these adhesion promoters are ideal to obtain a longer asphalt mixture lifetime.

For the preparation of the additive of the invention, the above mentioned products shall be used in a proportion which in the aggregate amounts to 100%. This proportion shall be according to the cover type intended to be constructed, that is to say, the type of requirement it shall be exposed to.

In a suitable drum and with constant agitation, the flux product three components shall be mixed up to obtaining a correct homogenization.

As these compounds have a great affinity among them, no complex equipment shall be needed, but it shall be suitable for the task to be accomplished, mixing and obtaining an excellent quality final product.

In a tank heated with an oil bath for a temperature range of 70 to 100° C., and having a variable speed shaker, a suitable mixing and homogenization of the latter with the balance of components of the invention product is carried out.

Samples at the mixer outlet shall be taken in order to check the correct manufacturing process.

The additive of the present invention obtained in the above mentioned way, is directly incorporated to the asphalt tanks.

The stored asphalt cement shall have temperatures ranging from 120 to 140° C., the additive shall be incorporated in the recommended proportion and the proper homogenization of the additive with the asphalt cement shall be obtained through the recirculation pump contained in the tank.

It shall be always convenient that both products be in contact few hours prior to their use.

Also and according to the invention, an asphalt cement and an asphalt mixture incorporating the additive of the invention are provided.

Asphalt Cement.

The modified asphalt cement product comprises a bituminous binder treated with the additive of the present invention.

This final product obtained as from both materials is in charge to recover the petreous aggregate particles.

The cationic polarity aminic compound is an imidazoline alkylamido type, as a cationic support for promoting the further adhesion on siliceous type aggregates, shifting the monolayer which is usually covering the negative charge density surfaces. Suitable aminic compounds of excellent quality can be obtained from products traded by Laher Mercantil, Polydem S.A., Akzo Nobel, etc.

Asphalt Concrete Mixture

The asphalt mixture manufactured with the additive of the present invention comprises a mixture of asphalt concrete and the above mentioned additive. The resulting product has a workability that is completely operable at mean temperatures. This mixture is generally comprised by granitic aggregates of different sizes (6-20), (6-12), (3-9), (0-6), the measures correspond to millimeters for the sizes of aggregates, glassmaking sand and mineral refill, using thicknesses of 17 to 80 mm.

RAP can be also used, that is to say a product of the old pavement recovery, mixed with virgin aggregates. The aggregate maximum size is generally 20 mm. For the elaboration of the mixtures, asphalt cements, the additive of the invention, traditional petreous aggregates, iron and steel slags, glassmaking sands and in certain cases refills called fillers are used. The optimum content of asphalt cement as well as the general characteristics of the aggregates comply with the standard (VN-E9-(86)-Vialidad Nacional—Argentine Republic).

The mixture is an asphalt concrete the elaboration of which is made under hot conditions at a temperature lower than the usual ones, in continuous or volumetric asphalt plants, the penetration of which is usually 70/100 and/or 50/60, with selected petreous aggregates and the new additive, allowing its use in patching works, pavement and repaving of streets and roads.

The most used asphalt cements are: 50/60, 70/100 or 150/200 ($\frac{1}{10}$ mm) (IRAM 6604 Standard) using 50/60 for high room temperature, 70/100 for mean room temperature locations and finally 150/200 for extremely low room temperatures.

The individual components of the additive of the invention vary according to the different objectives to be fulfilled.

In order to develop an asphalt mixture with a very important adherence degree between the aggregate-bitumen pair, we must increase the flux and aminic compound percentage. In order to obtain a mixture with a higher degree of workability, we must increase the percentage of lubricant and titrate the flux and aminic compound percentages.

| Granulometry of Aggregates | | | |
|---|---|---|---|
| Continuous granulometry (Thicknesses up to 4 cm) | | Discontinuous granulometry (Thicknesses up to 3 cm) | |
| Sieve N* | Pass % (Limits) | Sieve N* | Pass % (Limits) |
| 3/4" | 100 | | |
| 1/2" | 95-100 | 1/2" | 100 |
| 3/8" | 80-95 | 3/8" | 90-100 |
| N*4 | 53-76 | N*4 | 33-42 |
| N*8 | 39-57 | N*8 | 25-35 |
| N*16 | 29-44 | N*16 | — |
| N*30 | 20-33 | N*30 | 14-25 |
| N*50 | 14-25 | N*50 | — |
| N*100 | 9-18 | N*100 | — |
| N*200 | 4-10 | N*200 | 7-12 |

Different sizes or granulometries and thicknesses are used in every country, according to the traffic requirements. In order to evaluate the quality parameters of the mixtures under study, Marshall type probes are manufactured. Their manufacturing is carried out at 120-140° C. approximately and with a compaction energy of 75 shocks per side, tested at 60° C. according to the above mentioned Vialidad Nacional Standard.

Marshall Titration Method

Marshall titration method objective is to determine the bitumen optimum content for aggregate specific combination, and is based on a mechanical test comprising the breaking of cylindrical probes of 101.6 mm diameter and 63.5 mm high, compacted through a tamping stick of a standardized weight and fall height, preheated at 60° C., through the application of a vertical load through a contour jaw and at a constant deformation speed of 50.8 mm/min.

The method defines densities and gap optimum contents which must be complied with during the pavement construction.

This is the most worldwide known and used test, both for the titration of bituminous mixtures and for their control in the plant, through the verification of the design parameters taking a sample from the plant.

Marshall Values to be Reached

Stability higher than 500 kg.

Remanent Stability higher than 95%.

Density higher than 2,300 gr/cm$^3$.

Gaps (between 3 and 6%)

The asphalt cement with the addition of the additive of the invention shall have fluxes, adherence reinforcing agents and lubricants in its structure, so that its viscosity be the necessary one to produce a total aggregate coverage, providing them a suitable adherence and also allow that the mixture may have a workability time superior to the usual ones.

The aggregates to be added shall be of an excellent quality, from well known origin, free of clays and organic matters, complying with the following characteristics:

Sieve N° 4 (VNE-10) sand pass equivalent: 55 minimum.

Los Ángeles (TRAM 1532) wear: 35% maximum.

Cubage (Aggreg. Retention on Sieve ⅜") (VNE-11): 0.6 minimum.

Durability (attack with sodium sulfate—5 cycles) TRAM 1525: 12% maximum.

Different sizes of the aggregates, glassmaking sand and fillers shall be used, according to the pavement thickness.

Moisture content in the mixture at the time of its laying out, when extended, shall not be higher than 0.2%.

Adherence Bridge

In order to obtain a perfect adherence between the existing pavement and the pavement to be laid out, a binding irrigation with diluted asphalt or polymer modified asphalt emulsion shall be made. Their quantity shall range between 0.250 liters/square meter to 0.500 liters/square meter.

Compaction

It shall be made with 8 to 10 tons self propelled leveling machine in continuous passes and then 18 to 20 tons self propelled pneumatic roller. The traffic must be immediately released and no detachment of aggregates shall be observed when traffic starts circulating on the pavement.

Particular Technical Considerations

This type of bituminous material comprises a mixture of petreous aggregates and bituminous binder fluxed and added with the additive of the invention, under hot conditions at temperatures below the usual ones, so as to keep their workability and compaction properties. Its use allows reducing the execution cost of the construction process, since it can be extended and compacted at a mean temperature.

The role of the asphalt cement improved with the additive of the invention is essential, since it assures that the requested viscosity is maintained.

Generally, this type of asphalt mixtures at the time requirements arise has a number of higher of gaps, which in the case of water penetration, the bitumen adherence with the aggregate which is outstandingly improved by the additive of the invention, shall avoid its destructive action.

The aggregate used shall be of a maximum quality, because:

1- The stress of this type of mixtures specially relies in its initial stage, in the internal friction of the mineral frame, therefore hardness and frictional texture of the aggregates is essential.

2- Permeability of the mixture in this stage obliges to the existence of a good shifting resistance of the binder.

In order to reach the maximum densification, the mixture shall keep the lubrication effect produced by the additive. Then, with traffic and the weather conditions, the mixture shall reach its optimum behavior.

The mixture is successfully used in patching and in pavement covers with thicknesses ranging between ¾" (20 mm) and 2½" (70 mm). It is compacted at mean temperatures through successive passes of a plain and pneumatic roller.

Initial Evaluation

In order to evaluate the quality of the asphalt mixture, Marshall type probes can be molded. It is poured at a determined temperature in a Marshall mold and 75 shocks per side are applied. Once cooled, the mixture is demolded, its apparent density is determined and tested at 60° C.

The asphalt cement with additive percentage used in the mixture shall range between 4.8% and 5.5%, depending on the aggregates specific surface.

If fillers are used, they are generally commercial lime.

The more the fillers percentage is, more percentage of asphalt cement shall occur.

Marshall Test Results

Marshall probes were molded with a 70/100 penetration virgin asphalt cement and others with an asphalt cement containing the additive of the invention.

Probes were molded with excellent quality aggregates, complying with the corresponding IRAM standards.

As the additive of the invention decreases the viscosity of the asphalt cement, the probes were molded with additive at a temperature below the one of the probes manufactured with virgin cement.

By using the B.T.D.C. (Bitumen, Test, Data, Chat) monogram and taking into account the individual characteristics of asphalts, we obtain the mixing and compacting temperatures from the graphs. The first one corresponds to approximately 1.7 Poise and the second one to 2.8 Poise.

The virgin asphalt characteristics are:

Penetration (25° C.-5 sec-100 g): 70 ¹/₁₀ mm. (IRAM 6576)

Softening point (ring and ball): 49° C. (IRAM 6841) Penetration index (Pfeiffer and Van Doormal): −0.6 Corresponding a mixing temperature of 158° C.

Regarding asphalt cement with the addition of 5% of the product of the invention, the following classification was obtained:

Penetration (25° C.-5 sec-100 g): 88 ¹/₁₀ mm (IRAM Rule No. 6576)

Softening point (ring and ball): 45.5° C. (IRAM Rule No. 6841)

Penetration index (Pfeiffer and Van Doormal): −1.00

Corresponding a mixing temperature of 139-140° C.

B.T.D.C. (Bitumen, Test, Data, Chat) monogram used by Shell on a worldwide basis, allows us to calculate the mixing and compacting temperatures for every particular asphalt cement.

It is necessary to know the asphalt materials characteristics, as follows: penetration at 25° C. and softening point, with both of them we draw a straight line, we move through the monogram and determine the temperatures in question.

| Percentages of Aggregates and Asphalt Cement used in the probe manufacturing | |
|---|---|
| Aggregate (6-20) | 40.0% |
| Aggregate (0-6) | 45.0% |
| Glassmaking Sand | 8.0% |
| Commercial Lime | 2.0% |
| Asphalt Cement | 5.0% |

For the case of probes molded with additive, the same percentages of aggregates and asphalt cement were used, but the latter added with 5% of the product of the invention.

| MARSHALL results | PROBES | |
|---|---|---|
| | VIRGIN | ADDITIVE ADDED |
| Maximum Density (G/cm3) | 2.508 | 2.507 |
| Probe Density (G/cm3) | 2.406 | 2.408 |
| Gaps (%) | 4.0 | 3.9 |
| Marshall Stability (kg) | 1.060 | 1.000 |
| Marshall Fluency (mm) | 2.80 | 2.65 |
| Relationship Stability/Fluency (kg/cm) | 3.776 | 3.776 |
| V.M.A. (Aggreg. Gap) (%) | 16.0 | 15.9 |
| V.O.B. (Bitumen Occup. Gap)(%) | 75.0 | 75.5 |
| Remaining Stability | 82.0 | 98.9 |

Water 24 hours - 60° C. - % from normal

As it can be observed, the value having the highest influence was the one of the Remaining Stability, this is due to that the product of the invention is comprised by materials rejecting the water destructive action and having great affinity by the aggregates.

The Remaining Stability Test is a very demanding test, through which the probes are submerged during 24 hours at 60° C. and if there is no good adherence of the aggregate-binder, this value is substantially reduced.

The value informed is the percentage obtained in the submerged probes regarding Stability, with respect to those tested in an immediate way.

This is a very important factor in the pavement covers, since when there is any crack or capillarity rising, water reaches the aggregate-asphalt joint. And since the latter (water) has more affinity than asphalt with aggregates, it shifts the latter causing the mixture instability.

The asphalt mixtures prepared with the additive of the invention are protected against the operation of the water coming from different areas.

The joint energy present between the aggregate and the asphalt cement with the additive, provide asphalt mixtures with higher durability, therefore, a longer lifetime.

TESTS

Results of Adherence and Aging in a Molded Probe:

In order to evidence the adherence power of the asphalts treated with the additive of the invention, as well as the anti-aging effect that it produces, Marshall type probes were manufactured and tested in dry and moisten conditions.

The test was carried out in a spinning drum and several turns were applied in order to obtain conclusions. After the spinning of probes either 100, 200 or 300 turns, the wear suffered by them after spinning was calculated.

This wear is referred to as percentage per weight of the material detached.

The following test was carried out to evidence the adherence of the asphalts modified according to the present invention, according to Table 1 below.

TABLE 1

| Immersion | Weight | 100 turns | | 200 turns | | 300 turns | |
|---|---|---|---|---|---|---|---|
| Dry | Probe | Weight | % Loss | Weight | % Loss | Weight | % Loss |
| Immersion | 1035 gr | 991 gr | 4.25% | 644 gr | 37.78% | 293 gr | 71.69% |
| Immersion | 1028 gr | 775 gr | 24.61% | 474 gr | 53.89% | 281 gr | 72.67% |
| Immersion | 1033 gr | 942 gr | 8.81% | 625 gr | 39.50% | 342 gr | 66.89% |
| Average | 1032 gr | 903 gr | 12.53% | 581 gr | 43.70% | 305 gr | 70.41% |
| Dry | 1028 gr | 1000 gr | 2.72% | 966 gr | 6.03% | 928 gr | 9.73% |
| Dry | 1032 gr | 992 gr | 3.88% | 964 gr | 6.59% | 920 gr | 10.85% |
| Dry | 1032 gr | 1000 gr | 3.10% | 958 gr | 7.17% | 910 gr | 11.82% |
| Average | 1031 gr | 997 gr | 3.23% | 963 gr | 6.60% | 919 gr | 10.80% |

The results obtained are plotted in FIG. 1.

The following test was carried out to evidence the aging suffered by the asphalts modified according to the present invention, as per Table 2 below.

TABLE 2

| | | 100 turns | | 200 turns | | 300 turns | |
|---|---|---|---|---|---|---|---|
| Aging [hs] | Probe weight | Weight | % Loss | Weight | % Loss | Weight | % Loss |
| 0.0 | 1028 gr | 1000 gr | 2.72% | 966 gr | 6.03% | 928 gr | 9.73% |
| 0.0 | 1032 gr | 992 gr | 3.88% | 964 gr | 6.59% | 920 gr | 10.85% |

TABLE 2-continued

| Aging [hs] | Probe weight | 100 turns | | 200 turns | | 300 turns | |
| --- | --- | --- | --- | --- | --- | --- | --- |
| | | Weight | % Loss | Weight | % Loss | Weight | % Loss |
| 0.0 | 1032 gr | 1000 gr | 3.10% | 958 gr | 7.17% | 910 gr | 11.82% |
| Average | 1031 gr | 997 gr | 3.23% | 963 gr | 6.60% | 919 gr | 10.80% |
| 2.5 | 1033 gr | 995 gr | 3.68% | 947 gr | 8.33% | 871 gr | 15.68% |
| 2.5 | 1008 gr | 944 gr | 6.35% | 882 gr | 12.50% | 828 gr | 17.86% |
| 2.5 | 1035 gr | 994 gr | 3.96% | 945 gr | 8.70% | 883 gr | 14.69% |
| Average | 1025 gr | 978 gr | 4.65% | 925 gr | 9.82% | 861 gr | 16.06% |
| 5.0 | 1016 gr | 978 gr | 3.74% | 881 gr | 13.29% | 810 gr | 20.28% |
| 5.0 | 1024 gr | 989 gr | 3.42% | 931 gr | 9.08% | 891 gr | 12.99% |
| Average | 1020 gr | 984 gr | 3.58% | 906 gr | 11.18% | 851 gr | 16.62% |
| 10.0 | 1038 gr | 993 gr | 4.34% | 923 gr | 11.08% | 870 gr | 16.18% |
| 10.0 | 1033 gr | 992 gr | 3.97% | 929 gr | 10.07% | 833 gr | 19.36% |
| Average | 1036 gr | 993 gr | 4.15% | 926 gr | 10.57% | 852 gr | 17.77% |
| 20.0 | 1021 gr | 894 gr | 12.44% | 681 gr | 33.30% | 428 gr | 58.08% |
| 20.0 | 1031 gr | 731 gr | 29.10% | 546 gr | 47.04% | 386 gr | 62.56% |
| 20.0 | 1034 gr | 800 gr | 22.63% | 489 gr | 52.71% | 345 gr | 66.63% |
| Average | 1029 gr | 808 gr | 21.42% | 572 gr | 44.39% | 386 gr | 62.44% |

Figure 2:
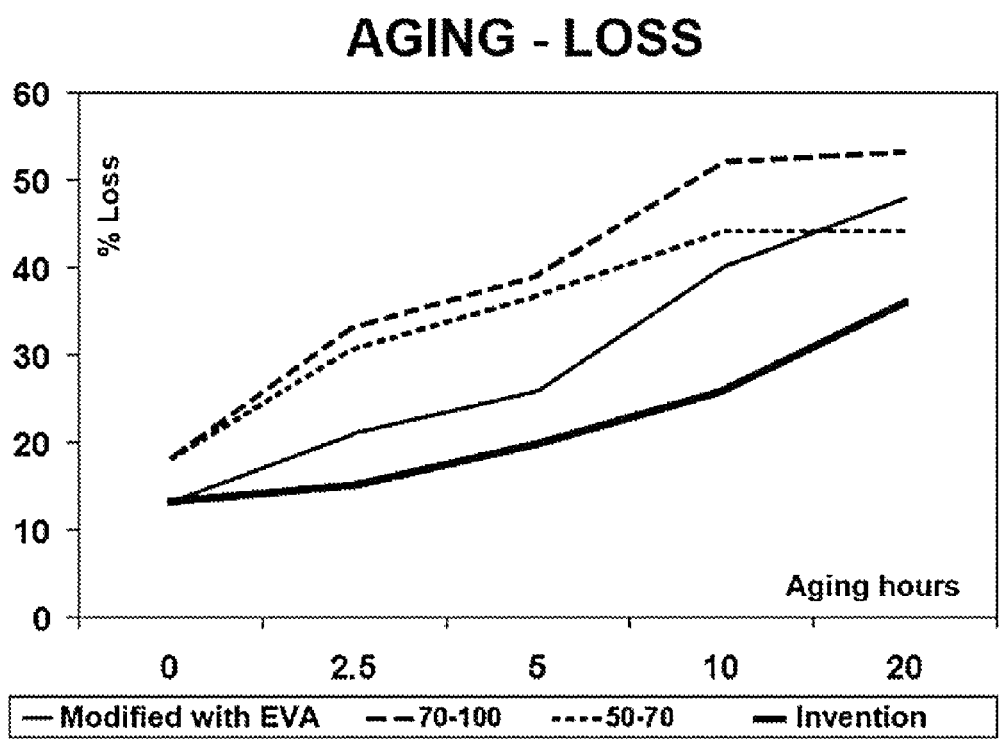
FIG. 2 shows a chart of the results on aging surveys carried out according to Table 2, with 300 turns.

The results obtained are plotted in FIG. 2.

The additive of the invention has proven superior characteristics when compared to the prior art, for example regarding manufacturing, less manufacturing and application temperature, higher workability, better slippage resistance, higher stability and higher durability.

Manufacturing

The product is an asphalt cement modifying additive allowing the manufacturing of asphalt mixtures in powerhouses at temperatures of from about 135° C. to about 150° C. They are applied in reduced thicknesses such as a micro pavement or in normal thicknesses for pavement carpets manufactured with asphalt concrete (generally up to 70 mm).

Asphalt mixtures prepared with the additive are particularly useful in pavement, repaving or patching. The latter can be repaired in routes and urban pavements.

The additive presented in this invention decreases the viscosity of the medium, therefore the temperature necessary for manufacturing the mixtures as well as the temperature of their laying out shall be lower. This causes energy saving and less quantity of products formed by the asphalt reheating. This also decreases the ecological damage.

Workability

This is the facility with which a mixture can be extended and compacted and obtained improving the asphalt cement, the type of aggregates and size thereof.

The trend to segregation of a mixture of the so called gross ones, can be attenuated through the adding of a fine aggregate or also by controlling the quality and quantity of the asphalt cement.

A good workability is obtained by making a correct selection of aggregates and therefore their size, as well as a correct and suitable viscosity of the asphalt cement.

A high viscosity shall cause the asphalt mixture to have a lower workability. With the additive of the invention, mixtures of asphalt cements of the required viscosity are obtained.

Resistance to Slippage

It is the ability of a surface to attenuate the wheels slippage of vehicles, specially when that surface is wet.

The tyre shall be in contact with the pavement instead of rolling on a water film, an event known as aquaplaning.

It is evident that a rough surface shall have a higher resistance to slippage than a plain one, and in order to obtain these characteristics, the aggregate texture must be evaluated, as well as its resistance to peeling and the mixture size or granulometry.

It is also important to consider that a mixture having excess of bitumen or with an unsuitable viscosity can be highly deformed and cause exudation, therefore slippage problems.

Mixtures with an important adherence of the aggregate-binder are obtained with the additive of the invention, therefore, they can be manufactured with granulometries increasing the resistance to slippage.

Stability

Stability is the ability to resist the stresses caused by the traffic loads without deformation. If a pavement is stable, it means it is capable of keeping its structure under repeated loads; if it is unstable, it generates traces, crimpings and any other defect indicating changes in the mixture.

Resistance to deformation is a complex property and mainly depends on friction and the inner bond of the mixture.

Inner friction between aggregate particles is related to their characteristics, such as their shape and texture.

Bonding is the result of the bitumen binding ability. This combination of friction and inner bonding avoids that aggregate particles move one with respect to other due to the forces exerted by traffic. The more angular the shape of particles and rougher their surface texture, the mixture stability shall be higher. Regarding bonding, it shall be higher when the asphalt cement viscosity is the suitable one.

We will comply with the stability requirements after a deep and complete analysis of traffic and weather conditions. The latter are very important since at high temperature, it is necessary to resort to suitable viscosity asphalt cements.

Excellent viscosity asphalt materials are obtained with the product of the invention.

Durability

This is the ability of pavement to resist wear such as potholes, cracks, peeling, etc., caused by the action of traffic or external aggressions, such as solar radiation, oxidation of the binder caused by air and water, oil spills, fuel spills, etc.

The aging of the bituminous mixtures is verified through micro cracks, loss or mortar, gross aggregate disengagement, etc.

It is considered a very complex phenomenon, on one hand due to the variety of reasons causing it and on the other hand due to the difficulty to define the physical-chemical type processes produced.

The durability of a mixture can be improved by using a higher amount of possible asphalt cement, using an aggregate size or granulometry that is resistant to separation, good aggregate-binder adherence and a correct compaction of the mixture to obtain water tightness. The effects derived from asphalt cement are decreased with the use of the additive of our invention.

The aggregate-binder adherence shall be completely favored by the action of the components of the additive of the invention.

While preferred embodiments of the present invention have been illustrated and described, it will be obvious to those skilled in the art that various changes and modifications may be made therein without departing from the scope of the invention as defined in the appended claims.

We claim:

1. An asphalt enhancing additive for use in the preparation of asphalt mixtures in a manner that the mixture are elaborated at a temperature range between 130° C. to 150° C. and the mixture can be applied, in the road paving, at a temperature below the temperature at which conventional asphalt mixtures are applied in road pavements, wherein the additive comprises at least:
   from about 6% to about 10% of an aminic compound comprising amido-imidazoline;
   from about 50% to about 80% of a flux comprising at least one olefinic polymer having molecular weight of about 900 Mn to about 2900 Mn, and
   from about 10% to about 40% of a lube oil lubricant.

2. The additive of claim 1, wherein the lubricant has a pour point of from about −9 to about −15; a flash point of from about 180° C. to about 215° C. and a viscosity index of about 95.

3. The additive of claim 2, wherein the lubricant has a pour point of about −12; a flash point of about 215° C. and a viscosity index of about 95.

4. The additive of claim 1, wherein the flux is at least one of a polymer and combination of polymers having different viscosities, the polymer or polymers a viscosity at 100° C. of from about 200 centistokes to about 5000 centistokes.

5. The additive of claim 4, wherein the at least one olefinic polymer comprises polyisobutylene.

6. An asphalt cement with enhanced binding properties, the cement comprising:
   a bituminous binder, and
   from about 3% to about 5% based on the total weight of the cement, of an additive comprising at least:
   from about 6% to about 10% of an aminic compound comprising amido-imidazoline;
   from about 50% to about 80% of a flux comprising at least one olefinic polymer having molecular weight of about 900 Mn to about 2900 Mn, and
   from about 10% to about 40% of a lube oil lubricant.

7. An asphalt mixture capable of being processes and worked a temperature below a conventional temperature, the mixture comprising at least:
   aggregates having different particle sizes, and
   an asphalt cement with enhanced binding properties, the cement comprising:
   a bituminous binder, and
   from about 3% to about 5% based on the total weight of the cement, of an additive comprising at least:
   from about 6% to about 10% of an aminic compound comprising amido-imidazoline;
   from about 50% to about 80% of a flux comprising at least one olefinic polymer having a molecular weight of about 900 Mn to about 2900 Mn, and
   from about 10% to about 40% of a lube oil lubricant.

8. The asphalt mixture of claim 7, wherein the content of the asphalt cement is from about 4.8% to about 5.5% based on the total weight of the asphalt mixture.

9. The asphalt mixture of claim 7, wherein the mixture is obtained at a temperature of from about 135° C. to about 150° C.

10. The asphalt cement of claim 6, wherein the cement with the additive has a penetration degree of 88 1/10 mm, a softening point of 45.5° C., and a penetration index of −1.00.

11. The asphalt mixture of claim 7, wherein the results of a Marshall test for a probe manufactured with the asphalt mixture are as follows:
   Maximum Density (G/cm3) 2.507
   Probe Density (G/cm3) 2.408
   Gaps (%) 3.9
   Marshall Stability (kg) 1.000
   Marshall Fluency (mm) 2.65
   Relationship Stability/Fluency (kg/cm) 3.776
   V.M.A. (Aggreg. Gap) (%) 15.9
   V.O.B. (Bitumen Occup. Gap) (%) 75.5
   Remaining Stability 98.9
   Water 24 hours-60° C.-% from normal.

12. The asphalt mixture of claim 7, wherein the results of a Marshall test for determining the aging of a probe manufactured with the asphalt mixture, is that the probe subject to 20 hs, at 300 turns in a spinning drum, had a wear of 62.44% where the wear is referred to a the percentage per weight of the material detached.

13. The asphalt mixture of claim 7, wherein the aggregates comprise:
   Aggregate (6 mm-20 mm) 40.0%
   Aggregate (0 mm-6 mm) 45.0%
   Glassmaking Sand 8.0%
   Commercial Lime 2.0%.

14. The asphalt cement of claim 6, wherein the bituminous binder comprises a cement selected from the group consisting of 50/60, 70/100, 150/200 (1/10 mm) (IRAM 6604 Standard).

15. The additive of claim 1, wherein the lubricant has the following characteristics:
   Viscosity at 40° C., ASTM D-445, 22 to 321 cSt
   Viscosity Index, ASTM D-2270, 95;
   Flash Point, ASTM D-92, 180 to 250° C.;
   Pouring Point, ASTM D-97, −9 to −27° C.;
   Corrosion o/Cu, (3 h −100° C.), ASTM D-130, 1b;
   Rust, ASTMD-665B, Pass;
   Number of Acid, KOH/g, ASTM D-974, 0.2 mg
   FZG Test, stages DIN 51354, 10;
   Emulsion, at 54.4° C. Min. ASTM D-1401, 30;
   Emulsion, at 82.2° C. Min. ASTM D-1401, 30.

16. The additive of claim 1, wherein the flux has the following characteristics:
   Molecular weight: 1200 to 2730 Mn.
   Molecular weight Less than 500, PLP CR-062, 5% to 12%;
   Dispersivity, (Max.) PLP CR-062, 2.5 to 2.8;
   Viscosity at 100° C., ASTM D-445, 595 to 4503 Mn;
   Relative density, 15/15° C., ASTM D-1298, 0.887-0.916;
   Flash Point, P.M. (Min), ASTM D-93 B, 170° C.-190° C.;
   Scale Color Pt/Co (Max.), APHA, ASTM D-1209, 70
   N° Neutralization (Max.), ASTMD-974, 0.02 mgHOK/Gr;
   Water (Max.) ASTM D-6304, 70 ppm;
   Iron (Max) PLP AN-0100 4 ppm;
   Aluminum (Max) PLP AN-0100 5 ppm;
   Sodium (Max) PLP AN-0100 1 ppm;
   Chloride (Max.) ASTM D-2522 200 ppm.

* * * * *